United States Patent Office 3,191,552
Patented June 29, 1965

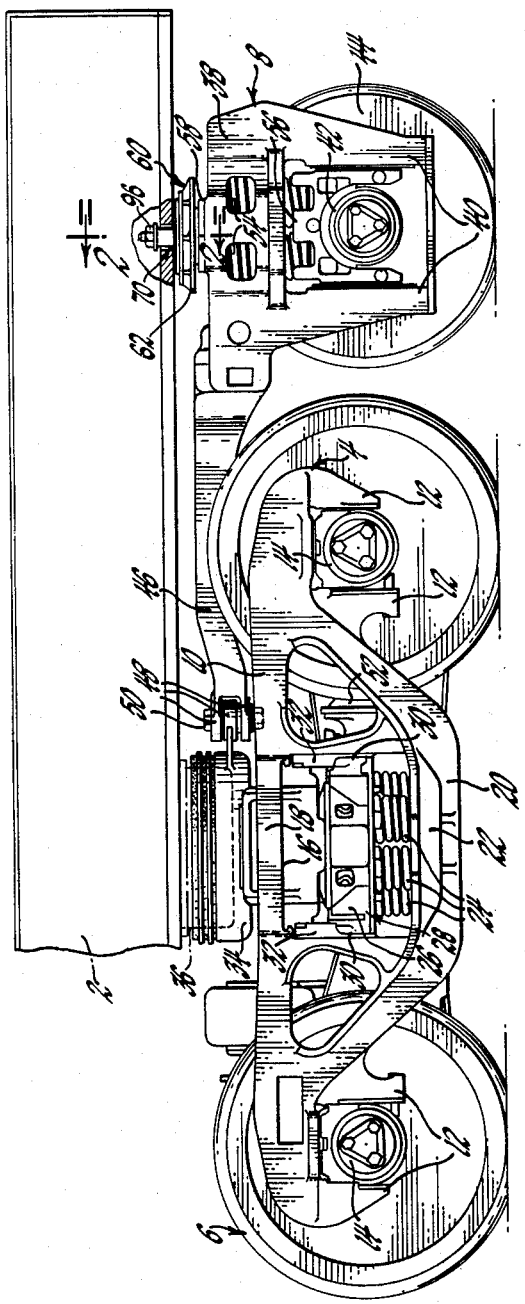

3,191,552
LEVELING PAD ARRANGEMENT
Ludvik F. Koci, Downers Grove, Ill., assignor to General Motors Corporation, Detroit, Mich., a corporation of Delaware
Filed Oct. 17, 1962, Ser. No. 231,063
4 Claims. (Cl. 105—176)

This invention relates generally to a leveling pad arrangement and particularly to devices in which it is desired to support two flat generally parallel surfaces against each other and to provide means for adjusting one of the surfaces so that it will be perfectly parallel or flat with respect to the other surface.

It is well known in engineering fields that there are occasions when in order to reduce the load per unit of area it is desired to spread the load over relatively large surfaces. When these surfaces are rigid, however, unless they are perfectly aligned the objective is often defeated. It is therefore an object of this invention to provide adjustable means usable between flat surface areas supported against each other to assure that the surface areas are in alignment.

It is a further object of this invention to provide such means especially adapted for use in railway vehicles wherein a truck is provided at one end thereof to take the body load of the railway vehicle, which load, however, is supported at several different locations on flat surfaces which must be kept in alignment so that the surface areas are completely engaged to reduce the unit loading thereof.

For a more complete understanding of the invention and the objects thereof, reference may be made to the accompanying description and drawings in which:

FIGURE 1 is an elevational view of a railway vehicle including a truck for supporting one end of the body thereof with the unique leveling pad assembly applied thereto.

FIGURE 2 is a view taken on the line 2—2 of FIGURE 1 and enlarged to illustrate the details of the leveling pad arrangement.

Referring now particularly to FIGURE 1, a railway vehicle is shown which includes a body and underframe 2 and a supporting truck assembly indicated generally by a numeral 4. The truck assembly 4 includes a main truck portion indicated generally by a numeral 6 and an auxiliary truck portion indicated generally by a numeral 8. The main truck portion includes the usual transversely spaced longitudinally extending side frame members 10, downwardly extending pedestals 12 on side frames 10, and journal box and wheel and axle sets 14. The transversely spaced side frames 10 include a window 16 therein formed by upper compression and lower tension pieces 18 and 20, respectively. Formed on tension pieces 20 are seat springs 22 which accommodate the lower ends of sets of coil springs 24, in turn supporting opposite ends 26 of a sprung bolster 28. The bolster ends of bolster 28 include guide tabs 30 engaging the edges 32 forming the sides of the window 16 in frames 10 to thereby maintain tram between the side frames. The upper side of the bolster 28 has thereon a kingpin bearing well 34 in which is received a kingpin 36 fixed to the underside of the underframe of the railway vehicle body 2. The main portion 6 of truck assembly 4 thus supports the underframe of the body 2 and is adapted to pivot thereunder by reason of the kingpin 36 and well 34.

Because of the need for reducing axle loadings, the main portion 6 of truck assembly 4, which is a typical or conventional truck assembly, has been modified by the addition of the auxiliary portion 8. This auxiliary portion 8 comprises an auxiliary truck frame 38 which is in the nature of a yoke extending transversely and having downwardly depending pedestals 40 thereon embracing the journal boxes 42 in which are received the ends of a wheel and axle set 44. The auxiliary frame 38 also includes, rigid therewith, a tongue section or piece 46 which is pivotally fastened to the well 34 of bolster 28 by the nested bosses 48 and stud 50. It is to be noted that the tongue 46 passes over the top of one of the wheel and axle assemblies 14 thus enabling such wheel and axle assembly to be dropped along with the associated traction motor 52 supported on the axle of set 14 and truck frame 10 for easy bench maintenance thereof.

Returning to the auxiliary truck frame 38 for a moment, it may be observed that the underside thereof forms an upper spring seat for sets of coil springs 54 whose lower ends are seated in spring seats 56 on the upper sides of the journal box assemblies 42. There are transversely spaced flat surfaced supporting pads 58 located on the upper sides of the auxiliary frame 38. These supporting pads engage the underside of the railway vehicle body 2 to thereby assist in supporting the end of the railway vehicle body 2. These pads, however, must move laterally relative to the underside of the railway vehicle because the truck in following the curvatures of the track does not remain in alignment at all times with the vehicle body. In order to achieve proper loading of these supports 58, however, it is necessary that the cooperating surface on the underside of the vehicle body 2 be in alignment therewith. For this reason the leveling pads which form the primary subject of this invention and are indicated generally by a numeral 60 have been developed.

Referring now to FIGURE 2, it will be observed that one of the leveling pad arrangements indicated generally by the numeral 60 comprises a lower pad 62 having a flat downwardly facing surface 64 thereon adapted to engage an upwardly facing surface 66 formed on the support 58. Pad 62 also includes an upwardly facing concave spherical surface 68. An intermediate piece 70 has a lower flanged portion 72 provided with a mating convex spherical surface 74 engaging and adapted to be adjusted on the surface 68. The intermediate piece 70 is formed with abutting supports 76 adapted to be welded or otherwise secured to the underside of the railway vehicle body 2 which in this case constitutes a plate member 78. The plate member 78 is provided with a hole or aperture 80 through which extends a hollow cylindrical or necked-down portion 82 of the intermediate piece 70. The upper end of this cylindrical portion 82 is provided with a convex spherical surface 84 which is concentric with the spherical surfaces 68 and 74 all being generated about the same point. Resting on the spherical surface 84 is an adjusting piece 86 which also has a downwardly facing spherical surface 88 formed thereon engaging the spherical surface 84 and movable thereon. There is provided a stud 90 which is threaded into or otherwise fixed in a boss 92 on the pad 62. The stud 90 extends upwardly through the cylindrical portion 82 and a hole 94 in adjusting piece 86. A nut 96 is threaded on the free end of stud 90 so that when it is tightened down the pad 62 and the adjusting piece 86 are clamped to the intermediate piece 70. It will thus be appreciated that when it is desired to adjust the pad 62 so that the downwardly facing and upwardly facing surfaces 64 and 66 are in perfect alignment, it is merely necessary to loosen the nut 96 on stud 90 to make whatever adjustment is necessary by sliding the pad 62 and adjusting piece 86 and then again tightening the nut 96.

From the foregoing description it may now be appreciated that a very simple and unique adjustment feature has been provided to assure proper loading between relatively movable flat surfaces supported against each other.

I claim:
1. In a railway vehicle supported by a truck having an upwardly facing flat surface, a supporting pad arrangement secured to the underside of said vehicle to support and align said vehicle upon said truck, said arrangement comprising a pad member having a downwardly facing flat surface slidingly engaging said surface on said truck, an intermediate member secured to said vehicle of the underframe, said members having mating spherical surfaces formed thereon whereby said flat surfaces assume a parallel engaging relationship, an adjustment member, said intermediate and adjustment members having mating spherical surfaces formed thereon, and securing means clamping said adjustment member and said pad member to said intermediate member whereby said flat surfaces are retained in parallel engaging relationship.

2. Means supporting a railway vehicle body upon a truck comprising a supporting pad secured on the upper surface of the truck, said pad having an upwardly facing flat surface, an intermediate member secured to the underside of the vehicle body, said member having upwardly and downwardly facing concentric spherical surfaces, a pad member having a downwardly facing flat surface slidingly engaging said flat surface on said supporting pad, said pad member also having an upwardly facing spherical surface mating with said downwardly facing spherical surface on said intermediate member whereby said flat surfaces assume a parallel engaging relationship, an adjustment piece having a downwardly facing spherical surface mating with the upwardly facing spherical surface on said intermediate member, and securing means clamping said adjustment piece and said pad member to said intermediate member whereby said flat surfaces are retained in parallel engaging relationship.

3. The means claimed in claim 2 in which said intermediate member includes a flange portion on which the downwardly facing spherical surface is formed and a neck portion on which the upwardly facing spherical surface is formed.

4. A railway vehicle comprising a vehicle body, a main truck supporting said vehicle body for pivotal movement in a horizontal plane, an auxiliary truck beneath said vehicle body longitudinally spaced from said main truck and connected to said main truck for pivotal movement in a horizontal plane, said auxiliary truck having a pair of transversely spaced flat surfaced upper portions, a pair of transversely spaced supporting pads secured to the underside of said vehicle body above said flat surfaced portions of said auxiliary truck, said supporting pads each including a flat surfaced pad member slidingly engaging said flat surfaced portion of said auxiliary truck, an intermediate member secured to the underside of said vehicle body, said members having mating spherical surfaces formed thereon whereby said flat surfaces assume a parallel engaging relationship, an adjustment member, said intermediate and adjustment members having mating spherical surfaces formed thereon, and securing means clamping said adjustment member and said pad member to said intermediate member whereby said flat surfaces are retained in parallel engaging relationship.

References Cited by the Examiner

UNITED STATES PATENTS

| 691,699 | 1/02 | Fassett | 308—138 |
| 754,979 | 3/04 | Dorn | 308—138 |
| 801,554 | 10/05 | Smith | 308—138 |
| 2,285,140 | 6/42 | Barrows et al. | 308—138 |
| 2,698,208 | 12/54 | Dilg | 308—138 |

FOREIGN PATENTS

| 13,274 | 1906 | Great Britain. |
| 22,728 | 1910 | Great Britain. |
| 274,364 | 7/27 | Great Britain. |

ROBERT C. RIORDON, *Primary Examiner.*

FRANK SUSKO, *Examiner.*